United States Patent
Jernigan

(10) Patent No.: US 7,270,507 B1
(45) Date of Patent: Sep. 18, 2007

(54) COIL SLING

(76) Inventor: William Scott Jernigan, 1611 27th Ave. North, Birmingham, AL (US) 35207

( * ) Notice: Subject to any disclaimer, the term of this patent is extended or adjusted under 35 U.S.C. 154(b) by 38 days.

(21) Appl. No.: 11/331,411

(22) Filed: Jan. 12, 2006

Related U.S. Application Data

(60) Provisional application No. 60/643,213, filed on Jan. 12, 2005.

(51) Int. Cl.
*B60P 7/08* (2006.01)
(52) U.S. Cl. .................. 410/50; 410/20; 410/47; 410/97; 410/100
(58) Field of Classification Search .................. 410/20, 410/47, 97, 100, 49, 50; 24/298–299, 302; 248/499
See application file for complete search history.

(56) References Cited

U.S. PATENT DOCUMENTS

| | | | |
|---|---|---|---|
| 4,204,479 A | 5/1980 | Rosa | |
| 4,526,500 A * | 7/1985 | Patrick | .................. 410/48 |
| 5,425,608 A | 6/1995 | Reitnouer | |
| 5,538,376 A | 7/1996 | Borda | |
| 5,888,039 A | 3/1999 | Cooley | |

* cited by examiner

*Primary Examiner*—Stephen Gordon
(74) *Attorney, Agent, or Firm*—Kenneth M. Bush; Bush IP Law Group, LLC

(57) ABSTRACT

A safety coil sling for securing an industrial metal coil on a flatbed trailer having a round or elliptical primary cable attached at one end to a first anchoring chain and at an opposite end to a second anchoring chain, and a plurality of connecting cables for connecting opposite sides of the primary cable across the top of the coil, thereby securing the coil on the trailer. In an alternate embodiment, the primary cable is divided into parallel segments at the points of attachment of the connecting cables and the connecting cables are slidably attached to one of the parallel segments to allow the connecting cables to slide within a fixed area, thus providing a mechanism for relieving tension on the sling during weight shifts within the coil occurring during transport.

7 Claims, 4 Drawing Sheets

COIL SLING

RELATED PATENT APPLICATION

The present application claims priority to U.S. Provisional Patent Application No. 60/643,213, filed Jan. 12, 2005, incorporated herein by reference.

FIELD OF THE INVENTION

The present invention is related to cargo securing systems, and more particularly, to an apparatus for securing industrial metal coils on a flatbed trailer.

BACKGROUND OF THE INVENTION

Industrial metal coils are large sheets of metal formed into a donut-shaped coil that weigh as much as 30,000-50,000 lbs. These coils are presently transported on flatbed trailers and are typically secured by chains running through the center of the coil. Because of their substantial weight, these coils sometimes break loose from the securing chains during transportation and fall off the flatbed trailer, potentially resulting in prolonged closure of roadways while the coil is lifted back onto a trailer and re-secured. Further, there is a significant risk to life and property when these coils break loose due to their substantial weight.

Accordingly, there is a need for an apparatus for securing industrial metal coils on a flatbed trailer that is superior to presently known cargo securing systems.

SUMMARY OF THE INVENTION

The present invention is a safety coil sling for securing a coil on a flatbed trailer. The sling preferably comprises a round or elliptical primary cable attached at one end to a first anchoring chain and at an opposite end to a second anchoring chain, and a plurality of connecting cables for connecting opposite sides of the primary cable across the top of the coil, thereby securing the coil on the trailer. The first and second anchoring chains are anchored to the sides of the trailer. The sling preferably further comprises a third anchoring chain having a central portion coupled to one side of the primary cable and a fourth anchoring chain having a central portion coupled to an opposite side of the primary cable, wherein the ends of the third anchoring chain are anchored to the trailer forward of the coil and the ends of the fourth anchoring chain are anchored to the trailer rearward of the coil. In an alternate embodiment, the primary cable is divided into parallel segments at the points of attachment of the connecting cables and the connecting cables are slidably attached to one of the parallel segments to allow the connecting cables to slide within a fixed area, thus providing a mechanism for relieving tension on the sling during weight shifts within the coil occurring during transport.

DETAILED DESCRIPTION OF THE PREFERRED EMBODIMENTS

Figure 1:
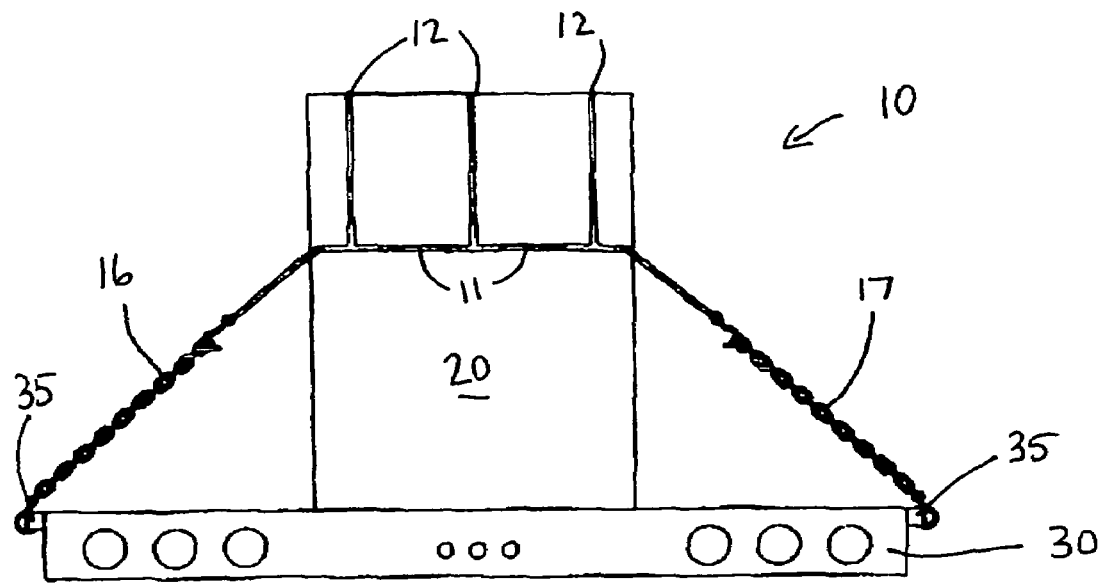
FIG. 1 is a rear view of a first embodiment of a safety coil sling securing a coil on a flatbed trailer.
Figure 2:
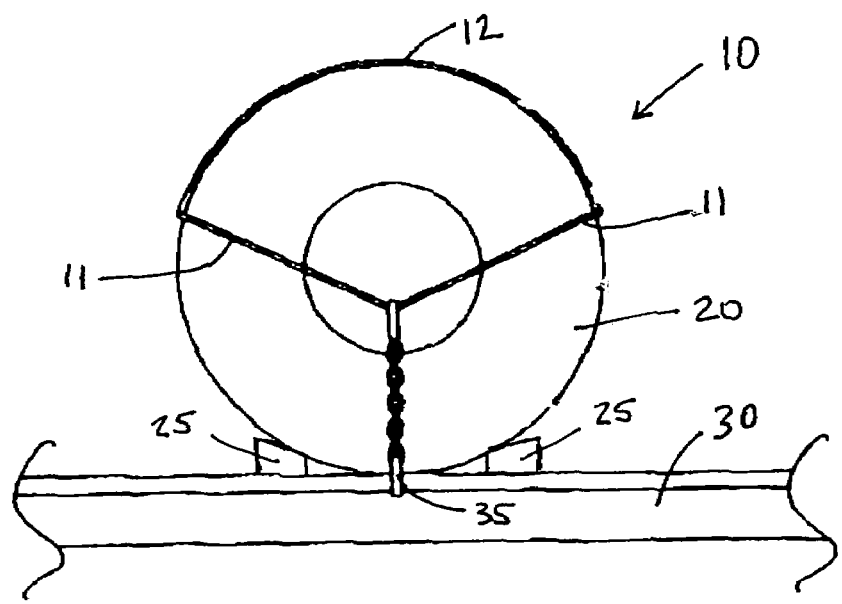
FIG. 2 is a side view of the sling of FIG. 1 securing a coil on a flatbed trailer.
Figure 3:
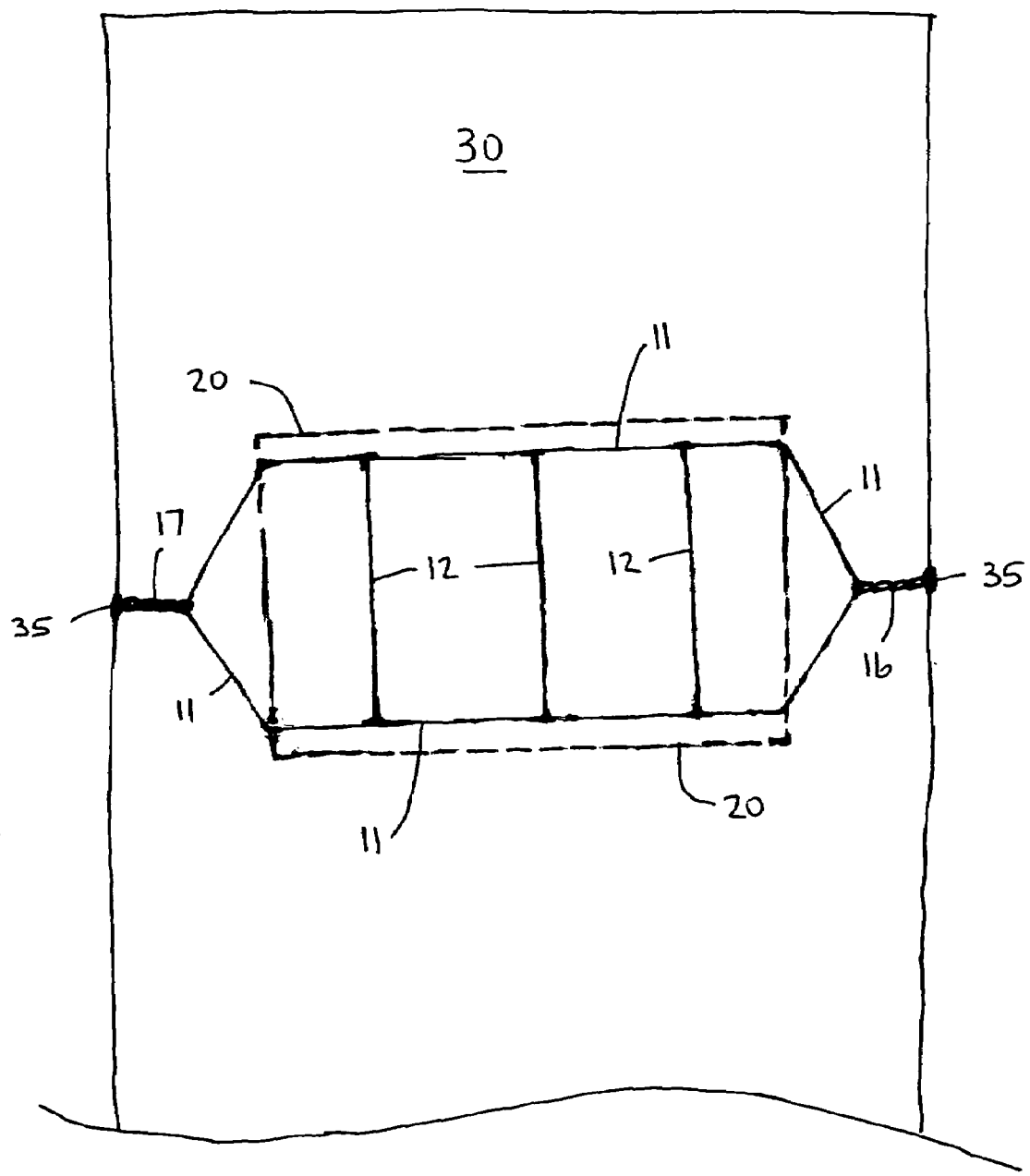
FIG. 3 is a top plan view of the sling of FIG. 1 securing a coil on a flatbed trailer.

The present invention is a safety coil sling 10 for securing a coil 20 on a flatbed trailer 30. The sling 10 preferably comprises a closed round or elliptical primary cable 11 attached at one end to a first anchoring chain 16 and at an opposite end to a second anchoring chain 17, and a plurality of substantially parallel secondary cables 12 for connecting opposite sides of the primary cable 11 across the top of the coil 20, thereby securing the coil 20 on the trailer 30. The primary and secondary cables 11, 12 are preferably made of steel. The first and second anchoring chains 16, 17 are each anchored to an anchoring position 35 formed along the side of the trailer 30, as is known in the prior art. A coil rack 25 is preferably used to stabilize the coil 20 to prevent the coil 20 from tending to roll, as is known in the prior art.

Figure 4:
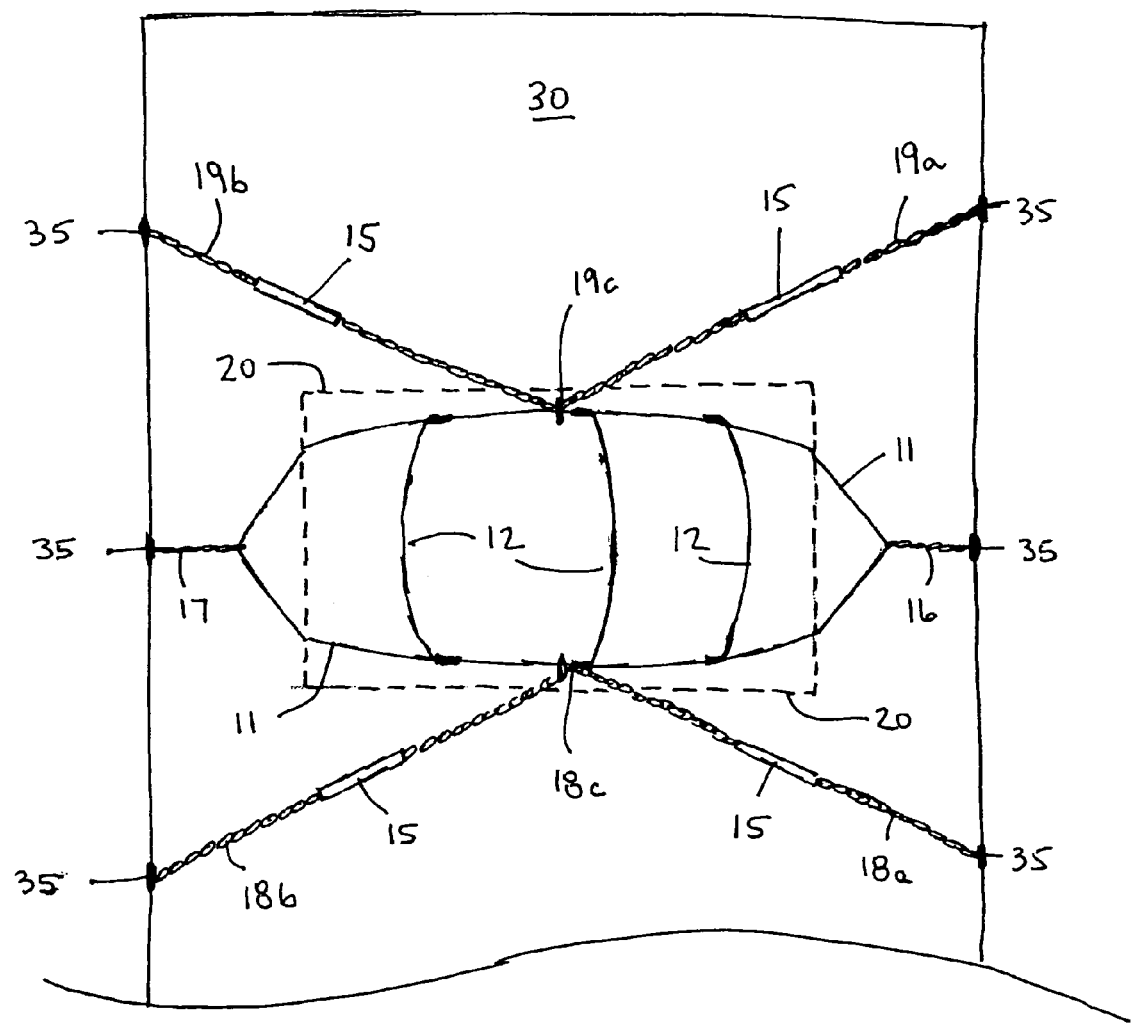
FIG. 4 is a top plan view of an alternate embodiment of a safety coil sling securing a coil on a flatbed trailer.

The sling 10 preferably further comprises a third anchoring chain 18 having its ends anchored to the trailer 30 forward of the coil. The third anchoring chain 18, shown in FIG. 4, has a first leg 18a attached to an anchoring position 35 formed along one side of the trailer 30, a second leg 18b attached to an anchoring position 35 formed along the opposite side of the trailer 30, and a central portion 18c coupled to one side of the primary cable 11. The sling 10 may further comprise a fourth anchoring chain 19 having its ends anchored to the trailer 30 rearward of the coil. The fourth anchoring chain 19 has a first leg 19a attached to an anchoring position 35 formed along one side of the trailer 30, a second leg 19b attached to an anchoring position 35 formed along the opposite side of the trailer 30, and a central portion 19c coupled to an opposite side of the primary cable 11. Each leg of the third and fourth anchoring chains 18, 19 preferably comprises a chain binder 15 for adjusting the tension on the chains, as is known in the prior art.

Figure 5:
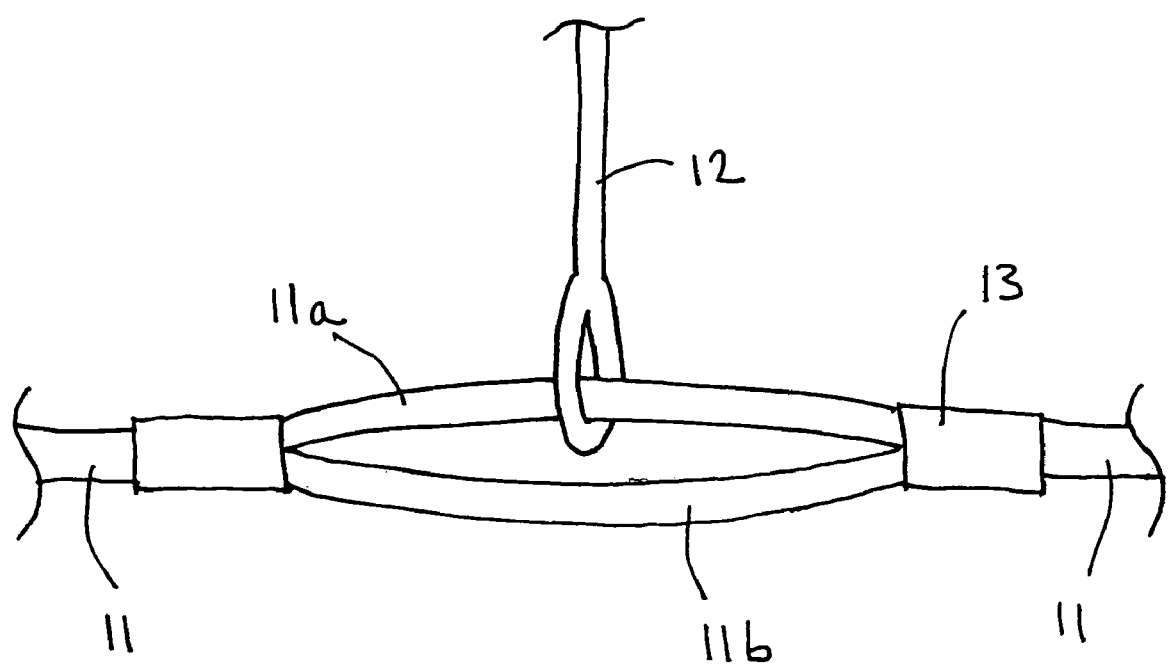
FIG. 5 is an enlarged view of an alternate embodiment of a safety coil sling having an alternate structure at the point of attachment of the connecting cable to the primary cable.

In an alternate embodiment shown in FIG. 5, the primary cable 11 is divided into substantially parallel cable segments 11a, 11b at the points of attachment of connecting cables 12, wherein the connecting cables 12 are slidably attached to the upper segment 11a to allow the connecting cables 12 to slide within a fixed area, thus providing a mechanism for relieving tension on the sling during weight shifts within the coil occurring during transport. The ends of cable segments 11a, 11b are preferably securely fastened to each other with metal sleeves 13.

While the invention has been shown and described in some detail with reference to representative embodiments, there is no intention that the invention be limited to such detail. On the contrary, the invention is intended to include any alternative or equivalent embodiments that fall within the spirit and scope of the invention as described and claimed herein.

The invention claimed is:

1. A coil sling for securing a coil on a trailer, comprising:
    a. a round or elliptical primary cable adapted to engage an upper portion of the coil;
    b. a first anchoring chain attached to a first end of said primary cable, wherein said first anchoring chain is adapted to anchor the coil to a first side of the trailer;
    c. a second anchoring chain attached to a second end of said primary cable, wherein said second anchoring chain is adapted to anchor the coil to a second side of the trailer; and d. a plurality of substantially parallel secondary cables connecting a first side of said primary cable to a second side of said primary cable, wherein said secondary cables are adapted to engage the top of the coil.

2. A coil sling according to claim 1, further comprising:
a. a third anchoring chain having a first end, a second end, and a central portion coupled to said first side of said primary cable, wherein said first and second ends of said third anchoring chain are adapted to anchor the coil to the trailer forward of the coil; and
b. a fourth anchoring chain having a first end, a second end, and a central portion coupled to said second side of said primary cable, wherein said first and second ends of said fourth anchoring chain are adapted to anchor the coil to the trailer rearward of the coil.

3. A coil sling according to claim 1, wherein said primary cable comprises a plurality of cable junctions, each cable junction having two substantially parallel cable segments, wherein each of two ends of said secondary cables is slidably attached to one of said cable segments such that said secondary cables may slide within a fixed area to relieve tension on said sling.

4. A coil sling for securing a coil on a trailer, comprising:
a. a round or elliptical primary cable adapted to engage an upper portion of the coil;
b. a first anchoring chain attached to a first end of said primary cable, wherein said first anchoring chain is adapted to anchor the coil to a first side of the trailer;
c. a second anchoring chain attached to a second end of said primary cable, wherein said second anchoring chain is adapted to anchor the coil to a second side of the trailer;
d. a third anchoring chain having a first end, a second end, and a central portion coupled to a first side of said primary cable, wherein said first and second ends of said third anchoring chain are adapted to anchor the coil to the trailer forward of the coil;
e. a fourth anchoring chain having a first end, a second end, and a central portion coupled to a second side of said primary cable, wherein said first and second ends of said fourth anchoring chain are adapted to anchor the coil to the trailer rearward of the coil; and
f. a plurality of parallel secondary cables connecting said first side of said primary cable to said second side of said primary cable, wherein said secondary cables are adapted to engage the top of the coil.

5. A coil sling according to claim 4, wherein said primary cable comprises a plurality of cable junctions, each cable junction having two substantially parallel cable segments, wherein each of two ends of said secondary cables is slidably attached to one of said cable segments such that said secondary cables may slide within a fixed area to relieve tension on said sling.

6. A coil sling for securing a coil on a trailer, comprising:
a. a round or elliptical primary cable adapted to engage an upper portion of the coil;
b. a first anchoring chain attached to a first end of said primary cable, wherein said first anchoring chain is adapted to anchor the coil to a first side of the trailer;
c. a second anchoring chain attached to a second end of said primary cable, wherein said second anchoring chain is adapted to anchor the coil to a second side of the trailer; and
d. a plurality of substantially parallel secondary cables connecting a first side of said primary cable to a second side of said primary cable, wherein said secondary cables are adapted to engage the top of the coil;
e. wherein said primary cable comprises a plurality of cable junctions, each cable junction having two substantially parallel cable segments, wherein each of two ends of each of said secondary cables is slidably attached to one of said cable segments such that said secondary cables may slide to relieve tension on said sling.

7. A coil sling according to claim 6, further comprising:
a. a third anchoring chain having a first end, a second end, and a central portion coupled to said first side of said primary cable, wherein said first and second ends of said third anchoring chain are adapted to anchor the coil to the trailer forward of the coil; and
b. a fourth anchoring chain having a first end, a second end, and a central portion coupled to said second side of said primary cable, wherein said first and second ends of said fourth anchoring chain are adapted to anchor the coil to the trailer rearward of the coil.

* * * * *